(12) United States Patent
Yao et al.

(10) Patent No.: US 11,646,611 B2
(45) Date of Patent: May 9, 2023

(54) LOCKING MECHANISM FOR SEGMENTED STATOR CORE

(71) Applicant: GM Global Technology Operations LLC, Detroit, MI (US)

(72) Inventors: Jian Yao, Shanghai (CN); Chengwu Duan, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 53 days.

(21) Appl. No.: 17/387,473

(22) Filed: Jul. 28, 2021

(65) Prior Publication Data

US 2023/0029734 A1    Feb. 2, 2023

(51) Int. Cl.
| | |
|---|---|
| *H02K 1/14* | (2006.01) |
| *H02K 21/24* | (2006.01) |
| *H02K 16/02* | (2006.01) |
| *H02K 1/18* | (2006.01) |

(52) U.S. Cl.
CPC ............ *H02K 1/148* (2013.01); *H02K 1/182* (2013.01); *H02K 16/02* (2013.01); *H02K 21/24* (2013.01)

(58) Field of Classification Search
CPC ........ H02K 1/148; H02K 1/182; H02K 16/02; H02K 21/24; H02K 21/12; H02K 1/141; H02K 2201/15
See application file for complete search history.

(56) References Cited

U.S. PATENT DOCUMENTS

| | | | |
|---|---|---|---|
| 5,801,473 A | * | 9/1998 | Helwig .................... H02K 1/12 310/216.061 |
| 10,566,866 B2 | | 2/2020 | Woolmer |
| 10,903,729 B1 | | 1/2021 | Cunnyngham et al. |

(Continued)

FOREIGN PATENT DOCUMENTS

| | | |
|---|---|---|
| DE | 102015223766 A1 | 6/2017 |
| DE | 112017005600 | 9/2019 |

(Continued)

OTHER PUBLICATIONS

Aydin et al., "Minimization of Cogging Torque in Axial-Flux Permanent-Magnet Machines: Design Concepts", IEEE Transactions on Magnetics, vol. 43, No. 9, Sep. 2007 (Year: 2017).*

(Continued)

*Primary Examiner* — Ahmed Elnakib
*Assistant Examiner* — Masoud Vaziri
(74) *Attorney, Agent, or Firm* — Vivacqua Crane PLLC

(57) ABSTRACT

A stator core assembly for an axial flux electric motor for an automobile includes a cylindrical outer case that defines a central axis, first and second disk shaped insulate frames axially spaced from one another and positioned within the outer case, each of the first and second insulate frames including a circular outer ring, a circular inner ring and a plurality of radial spokes extending between the outer ring and the inner ring and spaced circumferentially about the central axis, and a plurality of segmented core sections extending axially between the first and second insulate frames spaced circumferentially around and supported by the first and second insulate frames, wherein, a radial spoke is positioned between each adjacent pair of segmented core sections, and at least one radial spoke extends across each axial end of each one of the plurality of segmented core sections.

20 Claims, 5 Drawing Sheets

(56) References Cited

U.S. PATENT DOCUMENTS

| | | | |
|---|---|---|---|
| 10,944,303 B2 | 3/2021 | Hong et al. | |
| 2004/0063536 A1* | 4/2004 | Atarashi | B60K 6/485 |
| | | | 477/3 |
| 2004/0212267 A1 | 10/2004 | Jack et al. | |
| 2004/0245879 A1 | 12/2004 | Hirzel et al. | |
| 2007/0205675 A1 | 9/2007 | Petro et al. | |
| 2008/0303369 A1 | 12/2008 | Ionel et al. | |
| 2010/0225195 A1* | 9/2010 | Asano | H02K 1/02 |
| | | | 310/216.067 |
| 2011/0095642 A1* | 4/2011 | Enomoto | H02K 15/022 |
| | | | 335/297 |
| 2011/0241460 A1* | 10/2011 | Mebarki | H02K 21/24 |
| | | | 29/598 |
| 2011/0309726 A1* | 12/2011 | Carpenter | H02K 5/203 |
| | | | 310/75 R |
| 2012/0126653 A1* | 5/2012 | Yang | H02K 1/146 |
| | | | 310/156.32 |
| 2013/0127275 A1* | 5/2013 | Camilleri | H02K 7/088 |
| | | | 310/90 |
| 2013/0147291 A1 | 6/2013 | Woolmer et al. | |
| 2013/0181565 A1 | 7/2013 | Petro et al. | |
| 2015/0214789 A1* | 7/2015 | Lenz | H02K 1/145 |
| | | | 310/156.02 |
| 2015/0311756 A1 | 10/2015 | Sullivan | |
| 2016/0020656 A1 | 1/2016 | Brahmavar et al. | |
| 2016/0226352 A1* | 8/2016 | King | H02K 3/04 |
| 2016/0226353 A1* | 8/2016 | Court | B29C 45/14778 |
| 2017/0025927 A1* | 1/2017 | Weerts | H02K 9/06 |
| 2017/0054336 A1* | 2/2017 | Takezaki | H02K 7/003 |
| 2017/0155290 A1 | 6/2017 | Sakai et al. | |
| 2017/0179775 A1* | 6/2017 | Kim | H02K 1/148 |
| 2017/0187252 A1 | 6/2017 | Takahashi et al. | |
| 2019/0013707 A1* | 1/2019 | Mihai | H02K 1/2793 |
| 2019/0221361 A1 | 7/2019 | Manz et al. | |
| 2019/0305617 A1 | 10/2019 | Brahmavar | |
| 2019/0305655 A1 | 10/2019 | Brahmavar | |
| 2020/0251946 A1 | 8/2020 | Yao et al. | |
| 2020/0355447 A1 | 11/2020 | Rippel et al. | |
| 2022/0115924 A1* | 4/2022 | Zhang | H02K 9/197 |
| 2022/0337112 A1 | 10/2022 | Vianello | |

FOREIGN PATENT DOCUMENTS

| | | | |
|---|---|---|---|
| DE | 102020127447 A1 | 5/2021 | |
| WO | 2013099343 A1 | 7/2013 | |
| WO | 2020042912 A1 | 3/2020 | |
| WO | WO-2021005084 A1 * | 1/2021 | H02K 1/20 |

OTHER PUBLICATIONS

Ramanujam, M, "Performance improvement in PM machine using two-piece stator design", IEEE (Year: 2018).*

U.S. Appl. No. 14/401,613, filed Aug. 13, 2021, Jian Yao, Entire Document.

U.S. Appl. No. 17/401,663, filed Aug. 13, 2021, Jian Yao, Entire Document.

Kim et al, "Comparison of Axial Flux Permanent Magnet Synchronous Machines With Electrical Steel Core and Soft Magnetic Composite Core"; 2017, IEEE (Year: 2017).

\* cited by examiner

LOCKING MECHANISM FOR SEGMENTED STATOR CORE

INTRODUCTION

The present disclosure relates to an axial flux electric motor for use in an automobile, and more particularly to a stator core for an axial flux electric motor that includes locking mechanisms to prevent stator core fall out.

An electric motor is a machine that transforms electrical energy into mechanical energy by means of the action of the magnetic fields generated in its coils. An electric motor creates rotational, or circular, motion. The central part of the motor is a cylinder called the armature or rotor. The rotor is the part of the motor that spins. An axial flux motor (also known as an axial gap motor, or pancake motor) is a geometry of motor construction where the gap between the rotor and stator, and therefore the direction of magnetic flux between the two, is aligned parallel with the axis of rotation, rather than radially as with the concentric cylindrical geometry of the more common radial gap motor. In an axial flux electric motor, the stator is positioned next to the rotor and holds insulated coils of wire, usually copper. When a current is applied to the motor, the stator generates a magnetic field that drives the rotor.

In a segmented stator, stator core sections that are magnetically separated from one another form the stator. Often, the stator core sections are supported by a non-magnetic frame. One way that a segmented stator core may fail is due to fall out of the stator core sections. Due to the high magnetic forces across the gap between the stator and the rotor, the stator core sections may be pulled from the frame toward the rotor. This type of failure is known as stator core section fall out.

Thus, while current segmented stator core assemblies and electric motors having segmented stator core assemblies achieve their intended purpose, there is a need for a new and improved segmented stator core assembly that includes locking mechanisms to prevent stator core section fall out.

SUMMARY

According to several aspects of the present disclosure, an axial flux electric motor for an automobile includes a rotor assembly and a stator assembly, the stator assembly including a cylindrical outer case that defines a central axis, first and second disk shaped insulate frames, made from a non-magnetic material, axially spaced from one another and positioned within the outer case, each of the first and second insulate frames including a circular outer ring, a circular inner ring and a plurality of radial spokes extending between the outer ring and the inner ring and spaced circumferentially about the central axis, and a plurality of segmented core sections extending axially between the first and second insulate frames spaced circumferentially around and supported by the first and second insulate frames, wherein, a radial spoke is positioned between each adjacent pair of segmented core sections, and at least one radial spoke extends across each axial end of each one of the plurality of segmented core sections.

According to another aspect, the outer ring, the inner ring and the plurality of radial spokes of each of the first and second insulate frames define a plurality of openings within each of the first and second insulate frames, each of the plurality of segmented core sections including a first axial end having a pole shoe formed thereon and a second axial end having a pole shoe formed thereon, the pole shoes formed on the first and second axial ends of each of the plurality of segmented core sections having a shape that corresponds to and fits within the openings within each of the first and second insulate frames.

According to another aspect, each pole shoe includes at least one radial groove formed therein, one of the radial spokes of the first insulate frame being positioned within each of the at least one groove formed within the pole shoe of the first axial end of each of the plurality of segmented core sections, and one of the radial spokes of the second insulate frame being positioned within each of the at least one groove formed within the pole shoe of the second axial end of each of the plurality of segmented core sections.

According to another aspect, one radial spoke of the first insulate frame is positioned between the pole shoes of the first axial ends of each adjacent pair of segmented core sections, and one radial spoke of the second insulate frame is positioned between the pole shoes of the second axial ends of each adjacent pair of segmented core sections.

According to another aspect, each segmented core section comprises a soft magnetic composite material.

According to another aspect, each segmented core section comprises a laminate stack.

According to another aspect, each segmented core section comprises a first half and a second half that are glued together.

According to another aspect, each of the radial spokes of the first and second insulate frames and the radial grooves formed within the pole shoes of the first and second axial ends of each of the plurality of segmented core sections are straight.

According to another aspect, each of the radial spokes of the first and second insulate frames and the radial grooves formed within the pole shoes of the first and second axial ends of each of the plurality of segmented core sections define a radial axis that intersects a central axis of the segmented stator core.

According to another aspect, each of the radial spokes of the first and second insulate frames and the radial grooves formed within the pole shoes of the first and second axial ends of each of the plurality of segmented core sections define a radial axis that does not intersect with a central axis of the segmented stator core.

According to another aspect, each of the radial spokes of the first and second insulate frames and the radial grooves formed within the pole shoes of the first and second axial ends of each of the plurality of segmented core sections are v-shaped.

According to another aspect, the first and second insulate frames are made from a non-magnetic material.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
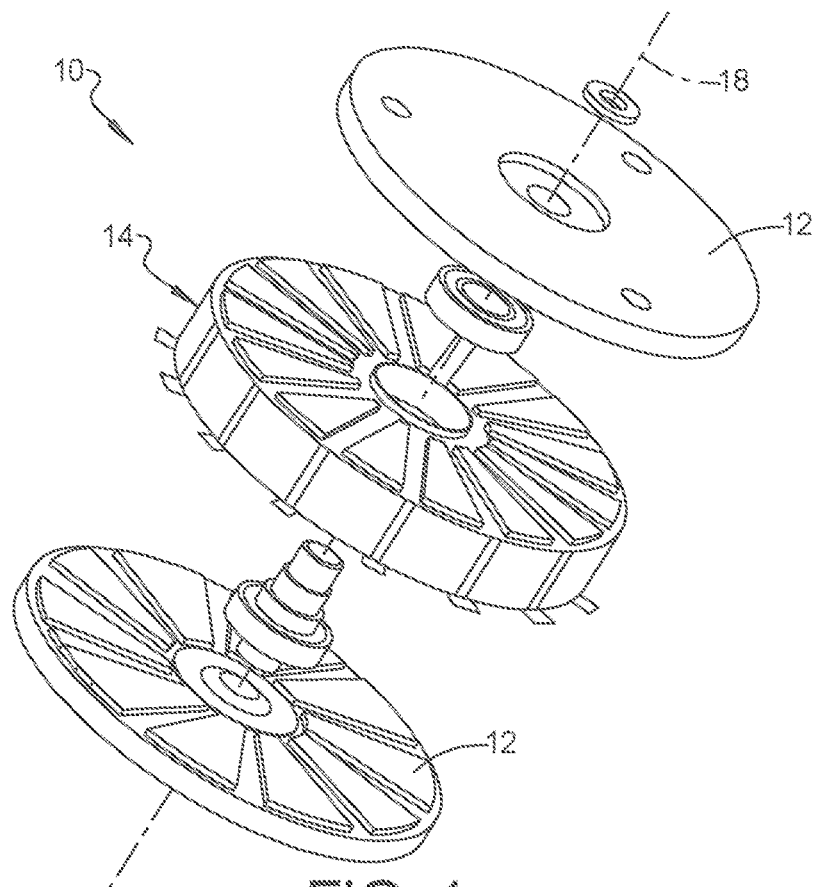
FIG. 1 is an exploded view of an axial flux electric motor according to an exemplary embodiment.

Referring to FIG. 1, an axial flux electric motor 10 for an automobile includes a rotor assembly 12 and a stator assembly 14. The rotor assembly 12 may include a single rotor 12 positioned adjacent the stator assembly 14, or, alternatively, the rotor assembly 12 may include two rotors 12, one positioned on either side of the stator assembly 14, as shown in FIG. 1.

Figure 2:
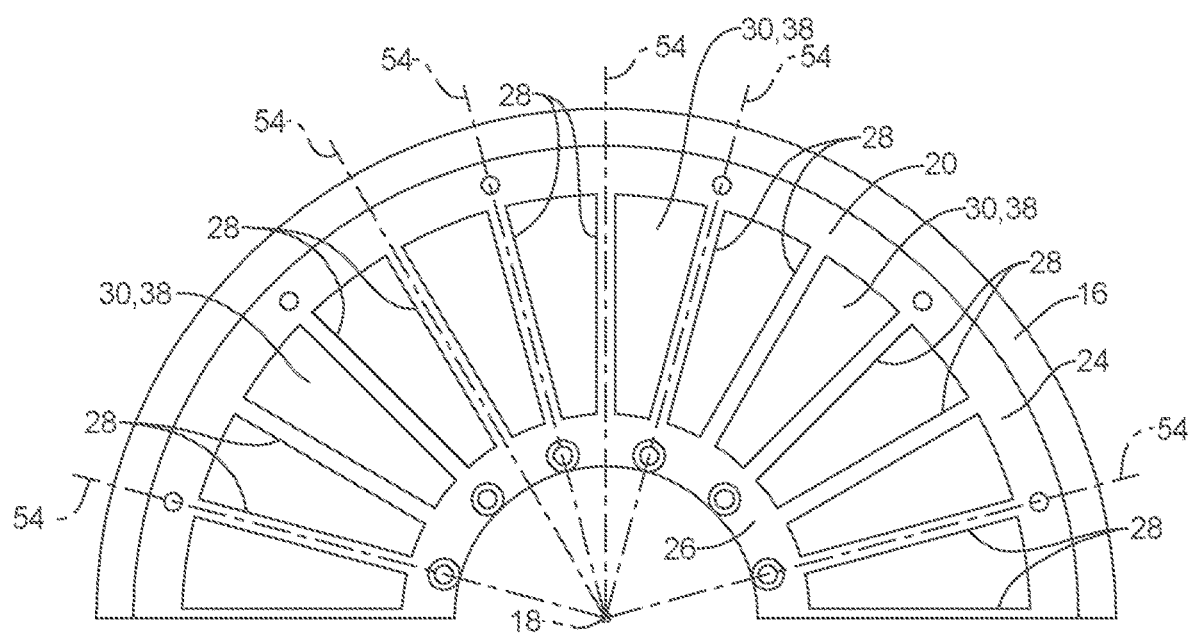
FIG. 2 is a perspective view of a stator core assembly according to an exemplary embodiment.
Figure 3:
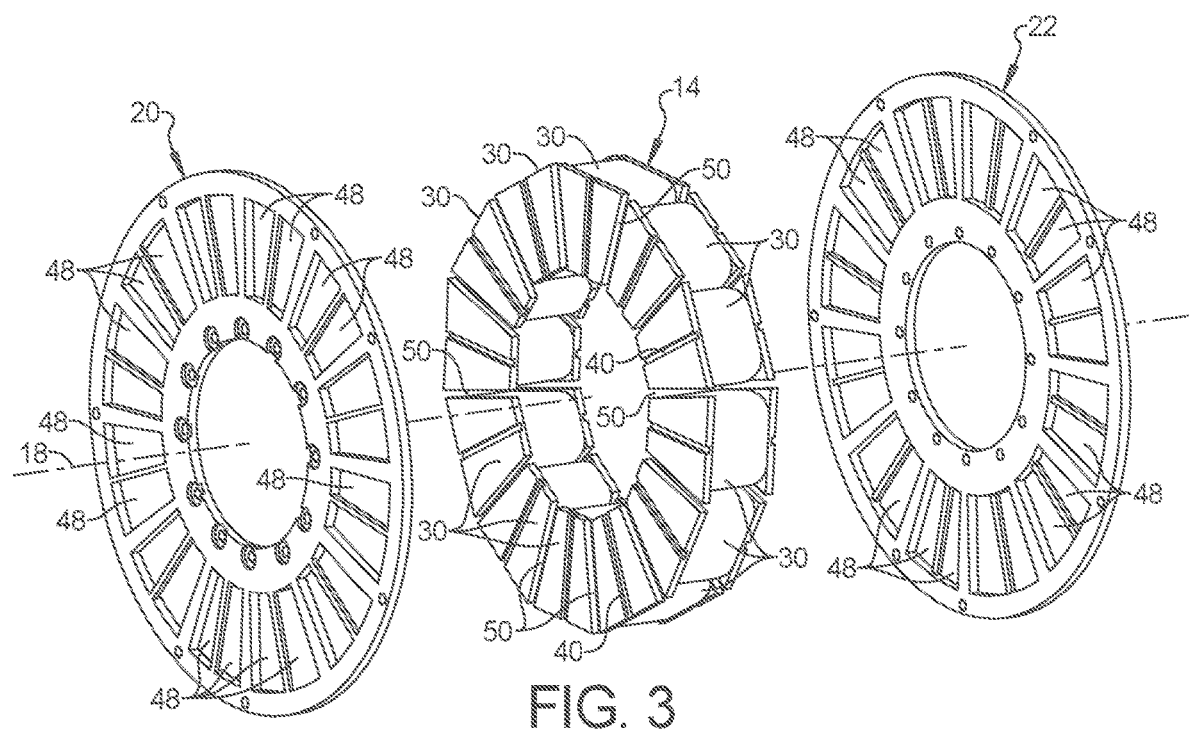
FIG. 3 is an exploded view of the stator core assembly according to an exemplary embodiment.

Referring to FIG. 2 and FIG. 3, the stator core assembly 14 includes a cylindrical outer case 16 that defines a central axis 18. First and second disk shaped insulate frames 20, 22 are axially spaced from one another and positioned within the outer case 16. Each of the first and second insulate frames 20, 22 includes a circular outer ring 24, a circular inner ring 26 and a plurality of radial spokes 28 extending between the outer ring 24 and the inner ring 26 and spaced circumferentially about the central axis 18.

A plurality of segmented core sections 30 extend axially between the first and second insulate frames 20, 22 spaced circumferentially around and supported by the first and second insulate frames 20, 22. Referring to FIG. 3, an exploded view of the plurality of segmented core sections 30 and the first and second insulate frames 20, 22 is shown. The plurality of segmented core sections 30 are positioned in an annular pattern. The first and second insulate frames 20, 22 are made from a non-magnetic material to magnetically insulate the plurality of segmented core sections from one another. As shown, the stator assembly 14 includes twelve segmented core sections 30. It should be understood that a stator assembly 14 in accordance with the present disclosure could include any suitable number of segmented core sections 30.

Figure 4:
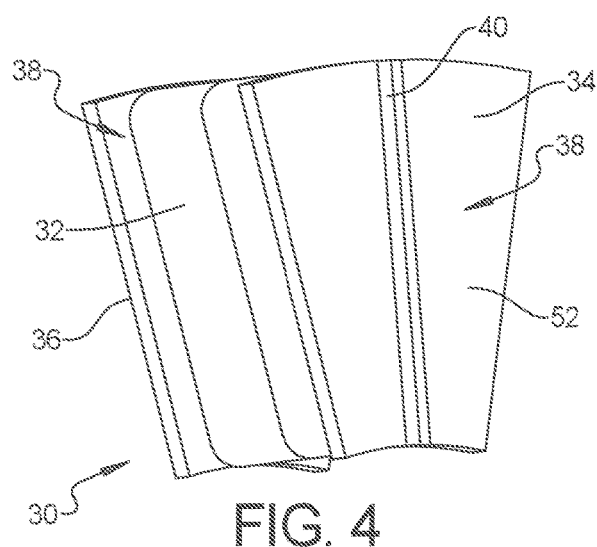
FIG. 4 is a perspective view of a segmented core section according to an exemplary embodiment.

Referring to FIG. 4, each of the plurality of segmented core sections 30 includes a trapezoidal shaped central bar 32, a first axial end 34 and a second axial end 36. The first axial end 34 and the second axial end 36 of each of the plurality of segmented core sections 30 includes a pole shoe 38 formed thereon. Each pole shoe 38 includes at least one radial groove 40 formed therein.

Figure 5:
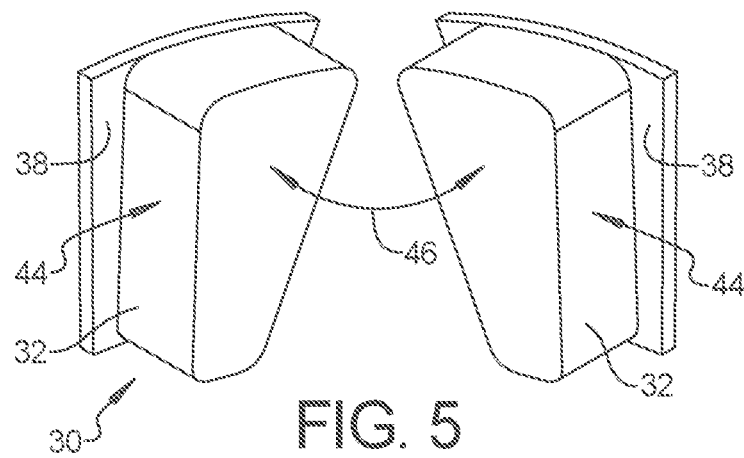
FIG. 5 is an exploded view of first and second halves of the segmented core section shown in FIG. 4.

Referring to FIG. 5, each segmented core section 30 includes a first half 42 and a second half 44 that are glued together, as shown by arrow 46. In an exemplary embodiment, each segmented core section 30 comprises a soft magnetic composite material. In another exemplary embodiment, each segmented core section 30 comprises a laminate stack.

Figure 6:
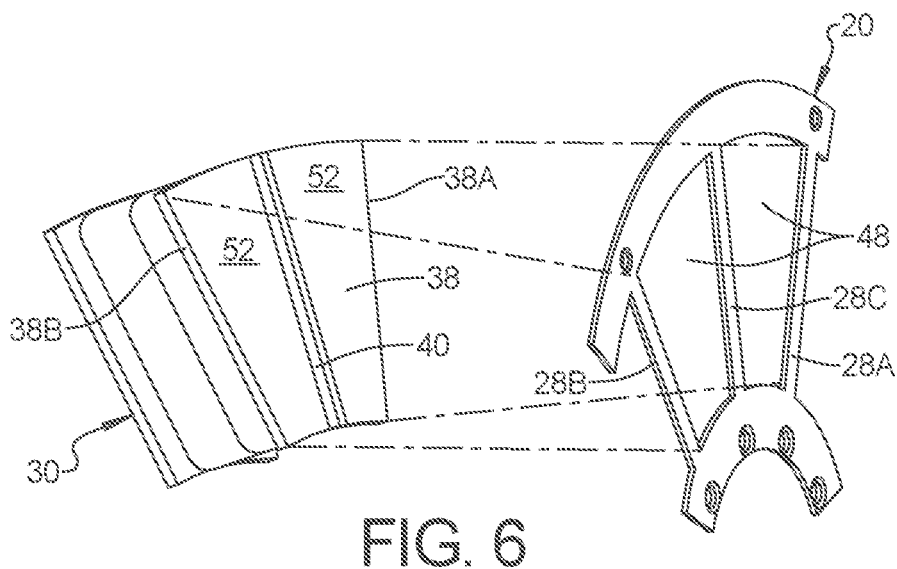
FIG. 6 is an exploded view of one segmented core section and a corresponding opening within an insulate frame.
Figure 7:
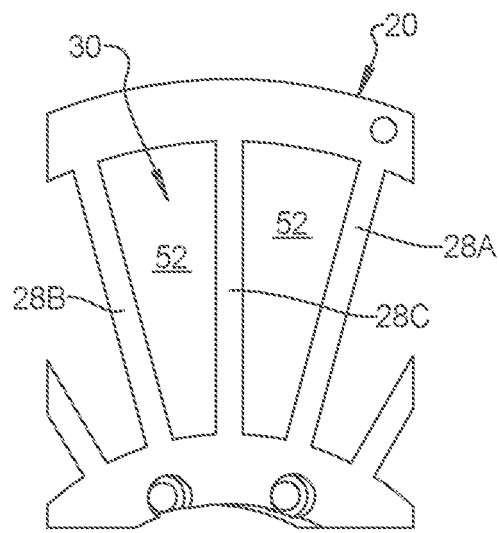
FIG. 7 is a perspective view of the segmented core section and the corresponding opening within the insulate frame of FIG. 6 shown assembled.

The outer ring 24, the inner ring 26 and the plurality of radial spokes 28 of each of the first and second insulate frames 20, 22 define a plurality of openings 48 within each of the first and second insulate frames 20, 22. Referring to FIG. 6 and FIG. 7, the pole shoes formed on the first and second axial ends 34, 36 of each of the plurality of segmented core sections 30 have a shape that corresponds to and fits within the openings 48 within each of the first and second insulate frames 20, 22.

Referring again to FIG. 3, each adjacent pair of segmented core sections 30 defines a radial slot 50. In an exemplary embodiment, a radial spoke 28 is positioned between each adjacent pair of segmented core sections 30 within each radial slot 50, and at least one radial spoke 28 extends across each axial end 34, 36 of each one of the plurality of segmented core sections 30. One of the radial spokes 28 of the first insulate frame 20 is positioned within each of the radial slots 50 at the first axial ends 34 of the plurality of segmented core sections 30, and one of the radial spokes 28 of the second insulate frame 22 is positioned within each of the radial slots 50 at the second axial ends 36 of the plurality of segmented core sections 30.

One of the radial spokes 28 of the first insulate frame 20 is positioned within each of the at least one radial groove 40 formed within the pole shoe 38 of the first axial end 34 of each of the plurality of segmented core sections 30. Likewise, one of the radial spokes 28 of the second insulate frame 22 is positioned within each of the at least one radial groove 40 formed within the pole shoe 38 of the second axial end 36 of each of the plurality of segmented core sections 30. One radial spoke 28 of the first insulate frame 20 is positioned between the pole shoes 38 of the first axial ends 34 of each adjacent pair of segmented core sections 30, and one radial spoke 28 of the second insulate frame 22 is positioned between the pole shoes 38 of the second axial ends 36 of each adjacent pair of segmented core sections 30.

Referring again to FIG. 6, a single segmented core section 30 having a single radial groove 40 formed within an axial face 52 of the pole shoe 38 is shown separated from corresponding openings 48 within one of the first and second insulate frames 20, 22. When the segmented core section 30 is assembled to the insulate frame 20, 22, a first radial spoke 28A will be positioned adjacent a first side 38A of the pole shoe 38 of the segmented core section 30 and a second radial spoke 28B will be positioned adjacent a second side 38B of the pole shoe 38 of the segmented core section 30. A third radial spoke 28C will be positioned within the radial groove 40 formed within the axial face 52 of the pole shoe 38.

It should be understood that the exploded view of FIG. 6 and the assembled view of FIG. 7 are representative of either the pole shoe 38 formed at the first axial end 34 of the segmented core section 30 being assembled to the first insulate frame 20, or the pole shoe 38 formed at the second axial end 36 of the segmented core section 30 being assembled to the second insulate frame 22. The pole shoes 38 of the first and second axial ends 34, 36 of the segmented core sections 30 are identical and the first and second insulate frames 20, 22 are identical. As shown in FIG. 4, FIG. 6 and FIG. 7 the axial face 52 of each of the pole shoes 38 of each of the segmented core sections 30 includes a single radial groove 40. It should be understood that there could be more than one radial groove 40 formed within the axial face 52 of each of the pole shoes 38 of each of the segmented core sections 30, each radial groove 40 including a radial spoke 28 extending therein.

The radial spokes 28 that extend across the axial face 52 of each of the pole shoes 38 within the radial grooves 40 formed therein prevent the segmented core sections 30 from moving axially toward an adjacent rotor assembly 12. Due to the high magnetic forces across the gap between the stator 14 and the rotor 12, the glued first and second halves 42, 44 of any one of the plurality of segmented core sections 30 may separate, resulting in one or both of the first and second halves 42, 44 being pulled toward the adjacent rotor assembly 12. The presence of the radial spokes 28 within the radial grooves 40 of the pole shoes 38 on each of the segmented core sections 30 provides a locking mechanism that prevents the first and second halves 42, 44 of a segmented core section 30 from moving toward the adjacent rotor 12 or rotors 12.

Referring again to FIG. 2 and FIG. 7, in an exemplary embodiment, each of the radial spokes 28 of the first and second insulate frames 20, 22 and the radial grooves 40 formed within the pole shoes 38 of the first and second axial ends 34, 36 of each of the plurality of segmented core sections 30 are straight. As shown, each of the radial spokes 28 of the first and second insulate frames 20, 22 and the radial grooves 40 formed within the pole shoes 38 of the first and second axial ends 34, 36 of each of the plurality of segmented core sections 30 define a radial axis 54 that intersects the central axis 18 of the stator core 14. For each of the plurality of segmented core sections 30, the pole shoes 38 are centrally aligned with the central bar 32.

Figure 8:
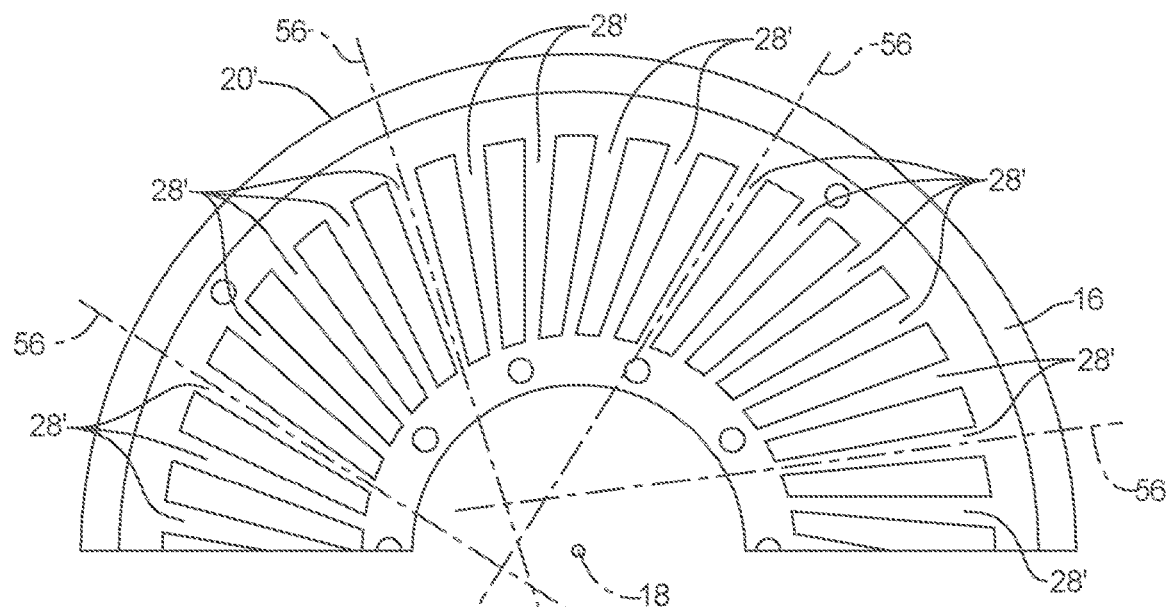
FIG. 8 is a perspective view of a stator core assembly having inclined radial grooves and radial spokes.
Figure 9:
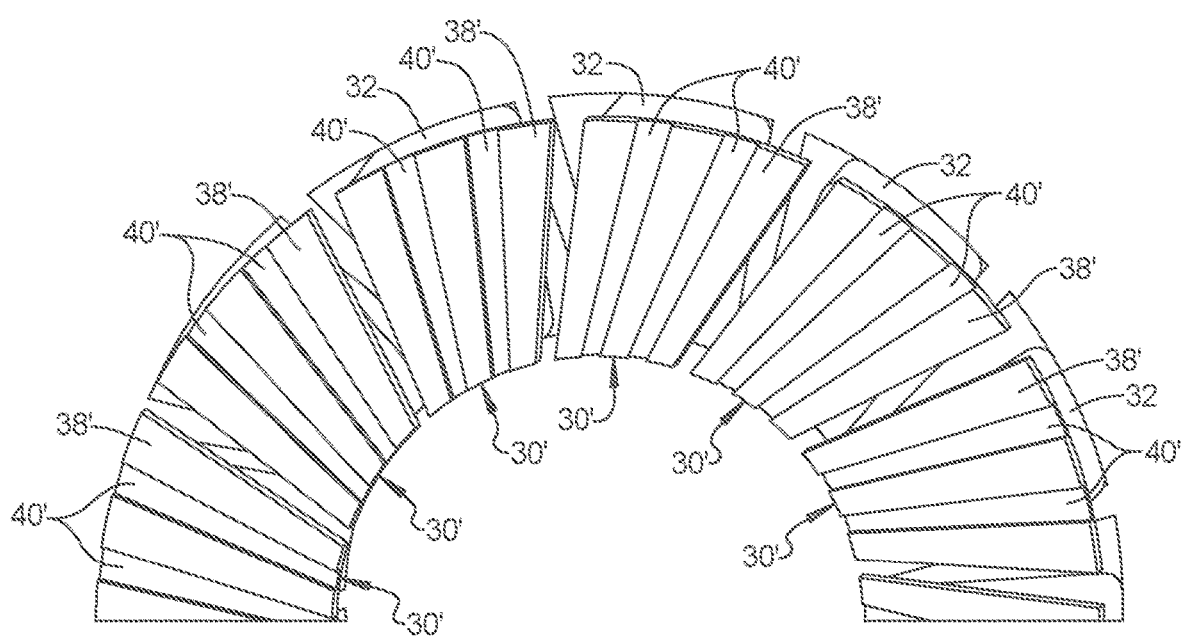
FIG. 9 is a perspective view of the stator core assembly shown in FIG. 8 wherein the insulate frames and outer case are removed.

Referring to FIG. 8 and FIG. 9, in another exemplary embodiment, each of the radial spokes 28' of the first and second insulate frames 20', 22' and the radial grooves 40' formed within the pole shoes 38' of the first and second axial ends 34', 36' of each of the plurality of segmented core sections 30' are straight, and each of the radial spokes 28' of the first and second insulate frames 20', 22' and the radial grooves 40' formed within the pole shoes 38' of the first and second axial ends 34', 36' of each of the plurality of segmented core sections 30' are inclined and define a radial axis 56 that does not intersect with the central axis 18 of the segmented stator core.

As shown in FIG. 9, Each of the pole shoes 38' of each of the plurality of segmented core sections 30' includes two radial grooves 40' formed therein, each including a radial spoke 28' positioned within. Additionally, to accommodate the inclined nature of the radial grooves 40' formed within the pole shoes 38', for each of the plurality of segmented core sections 30' the pole shoes 38' are skewed with respect to the central bar 32'. This exemplary embodiment provides less cogging of the electric motor 10.

Figure 10:
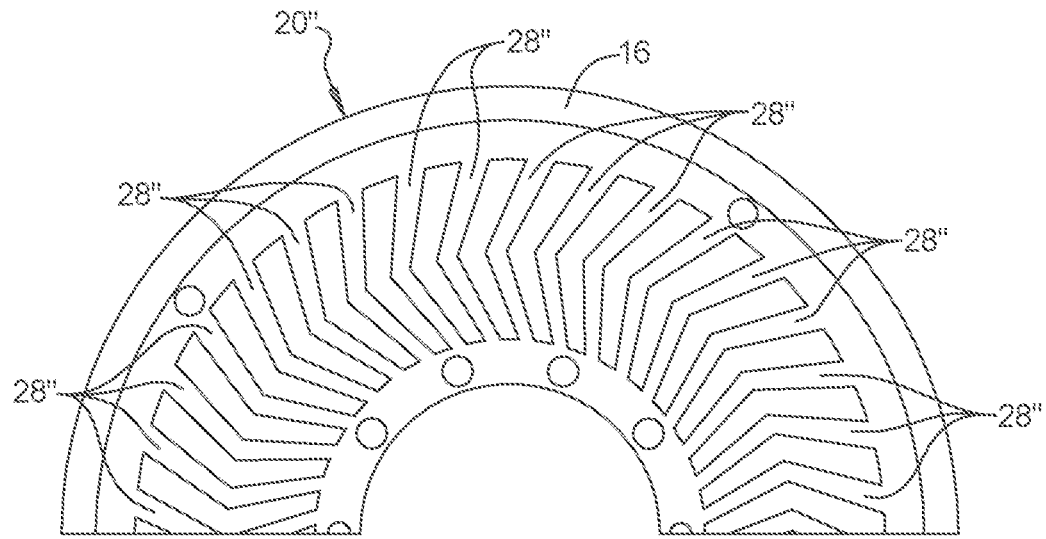
FIG. 10 is a perspective view of a stator core assembly having v-shaped radial grooves and radial spokes.
Figure 11:
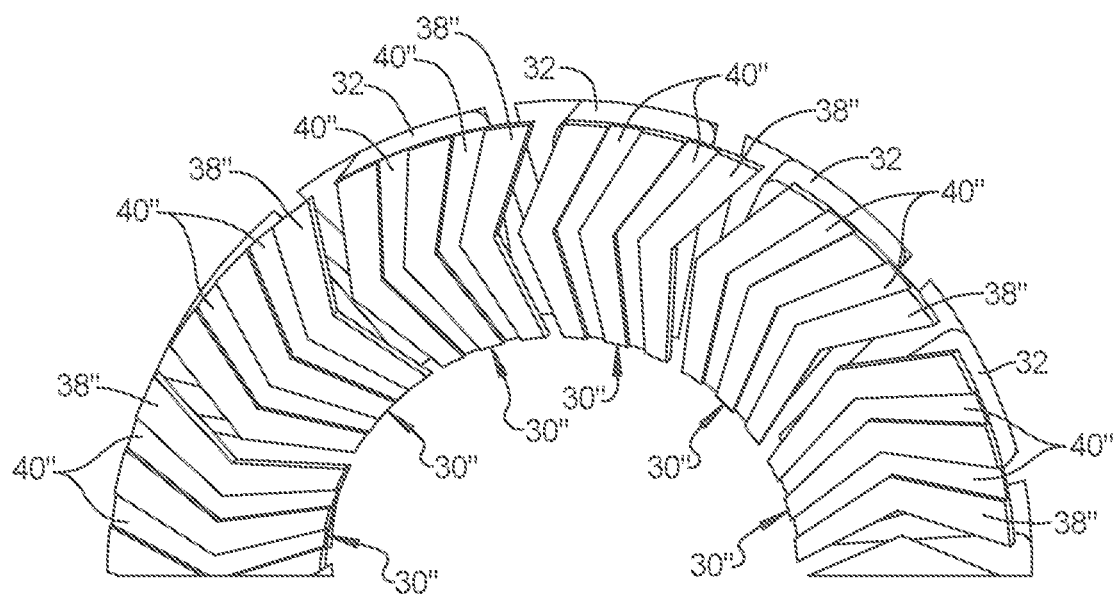
FIG. 11 is a perspective view of the stator core assembly shown in FIG. 10, wherein the insulate frames and outer case are removed.

Referring to FIG. 10 and FIG. 11, in another exemplary embodiment, each of the radial spokes 28" of the first and second insulate frames 20", 22" and the radial grooves 40" formed within the pole shoes 38" of the first and second axial ends 34", 36" of each of the plurality of segmented core sections 30" are v-shaped. As shown in FIG. 11, Each of the pole shoes 38" of each of the plurality of segmented core sections 30" includes two radial grooves 40" formed therein, each including a radial spoke 28" positioned within. Additionally, to accommodate the v-shaped radial grooves 40" formed within the pole shoes 38", for each of the plurality of segmented core sections 30" the pole shoes 38" are also v-shaped. This exemplary embodiment provides less cogging of the electric motor 10.

A stator core and an electric motor having a stator core of the present disclosure offers several advantages. The presence of the radial spokes 28 within the radial grooves 40 of the pole shoes 38 on each of the segmented core sections 30 provides a locking mechanism that prevents the first and second halves 42, 44 of a segmented core section 30 from moving toward the adjacent rotor 12 or rotors 12, thus preventing stator core section 30 fall out. In addition, having inclined or v-shaped radial grooves 40', 40" and radial spokes 28', 28" reduces cogging of the electric motor 10.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A stator core assembly for an axial flux electric motor for an automobile, comprising:
    a cylindrical outer case that defines a central axis;
    first and second disk shaped insulate frames axially spaced from one another and positioned within the outer case, each of the first and second insulate frames including a circular outer ring, a circular inner ring and a plurality of radial spokes extending between the outer ring and the inner ring and spaced circumferentially about the central axis and defining a plurality of openings within each of the first and second insulate frames; and
    a plurality of segmented core sections extending axially between the first and second insulate frames spaced circumferentially around and supported by the first and second insulate frames, each of the plurality of segmented core sections including a first axial end having a pole shoe formed thereon and a second axial end having a pole shoe formed thereon, the pole shoes formed on the first and second axial ends of each of the plurality of segmented core sections having a shape that corresponds to and fits within the openings within each of the first and second insulate frames;
    wherein, a radial spoke is positioned between each adjacent pair of segmented core sections, and each pole shoe includes at least one radial groove formed therein, one of the radial spokes of the first insulate frame being positioned within each of the at least one groove formed within the pole shoe of the first axial end of each of the plurality of segmented core sections, and one of the radial spokes of the second insulate frame being positioned within each of the at least one groove formed within the pole shoe of the second axial end of each of the plurality of segmented core sections.

2. The stator core assembly of claim 1, wherein the plurality of segmented core sections are positioned in an annular pattern.

3. The stator core assembly of claim 2, wherein each adjacent pair of segmented core sections defines a radial slot.

4. The stator core assembly of claim 3, wherein one radial spoke of the first insulate frame is positioned between the pole shoes of the first axial ends of each adjacent pair of segmented core sections, and one radial spoke of the second insulate frame is positioned between the pole shoes of the second axial ends of each adjacent pair of segmented core sections.

5. The stator core assembly of claim 4, wherein each segmented core section comprises a soft magnetic composite material.

6. The stator core assembly of claim 4, wherein each segmented core section comprises a laminate stack.

7. The stator core assembly of claim 4, wherein each segmented core section comprises a first half and a second half that are glued together.

8. The stator core assembly of claim 4, wherein each of the radial spokes of the first and second insulate frames and the radial grooves formed within the pole shoes of the first and second axial ends of each of the plurality of segmented core sections are straight.

9. The stator core assembly of claim 8, wherein each of the radial spokes of the first and second insulate frames and the radial grooves formed within the pole shoes of the first and second axial ends of each of the plurality of segmented core sections define a radial axis that intersects a central axis of the segmented stator core.

10. The stator core assembly of claim 8, wherein each of the radial spokes of the first and second insulate frames and the radial grooves formed within the pole shoes of the first and second axial ends of each of the plurality of segmented core sections define a radial axis that does not intersect with a central axis of the segmented stator core.

11. The stator core assembly of claim 4, wherein each of the radial spokes of the first and second insulate frames and the radial grooves formed within the pole shoes of the first and second axial ends of each of the plurality of segmented core sections are v-shaped.

12. The stator core assembly of claim 4, wherein the first and second insulate frames are made from a non-magnetic material.

13. An axial flux electric motor for an automobile, comprising:
   a rotor assembly, and
   a stator assembly, the stator assembly including:
      a cylindrical outer case that defines a central axis;
      first and second disk shaped insulate frames, made from a non-magnetic material, axially spaced from one another and positioned within the outer case, each of the first and second insulate frames including a circular outer ring, a circular inner ring and a plurality of radial spokes extending between the outer ring and the inner ring and spaced circumferentially about the central axis defining a plurality of openings within each of the first and second insulate frames; and
      a plurality of segmented core sections extending axially between the first and second insulate frames spaced circumferentially around and supported by the first and second insulate frames, each of the plurality of segmented core sections including a first axial end having a pole shoe formed thereon and a second axial end having a pole shoe formed thereon, the pole shoes formed on the first and second axial ends of each of the plurality of core sections having a shape that corresponds to and fits within the openings within each of the first and second insulate frames;
      wherein, a radial spoke is positioned between each adjacent pair of segmented core sections, and each pole shoe includes at least one radial groove formed therein, one of the radial spokes of the first insulate frame being positioned within each of the at least one groove formed within the pole shoe of the first axial end of each of the plurality of segmented core sections, and one of the radial spokes of the second insulate frame being positioned within each of the at least one groove formed within the pole shoe of the second axial end of each of the plurality of segmented core sections.

14. The electric motor of claim 13, wherein the plurality of segmented core sections are positioned in an annular pattern.

15. The electric motor of claim 14, wherein each adjacent pair of segmented core sections defines a radial slot.

16. The electric motor of claim 15, wherein one radial spoke of the first insulate frame is positioned between the pole shoes of the first axial ends of each adjacent pair of segmented core sections, and one radial spoke of the second insulate frame is positioned between the pole shoes of the second axial ends of each adjacent pair of segmented core sections.

17. The electric motor of claim 16, wherein each segmented core section comprises a first half and a second half that are glued together, each segmented core section comprising one of a soft magnetic composite material and a laminate stack.

18. The electric motor of claim 17, wherein each of the radial spokes of the first and second insulate frames and the radial grooves formed within the pole shoes of the first and second axial ends of each of the plurality of segmented core sections are straight and aligned with one of a radial axis that intersects a central axis of the core, and an inclined radial axis that does not intersect with the central axis of the segmented stator core.

19. The electric motor of claim 17, wherein each of the radial spokes of the first and second insulate frames and the radial grooves formed within the pole shoes of the first and second axial ends of each of the plurality of segmented core sections are v-shaped.

20. A stator core assembly for an axial flux electric motor for an automobile, comprising:
   a cylindrical outer case that defines a central axis;
   first and second disk shaped insulate frames axially spaced from one another and positioned within the outer case, each of the first and second insulate frames including a circular outer ring, a circular inner ring and a plurality of radial spokes extending between the outer ring and the inner ring and spaced circumferentially about the central axis, the outer ring, the inner ring and the plurality of radial spokes of each of the first and second insulate frames defining a plurality of openings within each of the first and second insulate frames; and
   a plurality of segmented core sections extending axially between and extending circumferentially around the first and second insulate frames, each of the plurality of segmented core sections including a first axial end having a pole shoe formed thereon and a second axial end having a pole shoe formed thereon, the pole shoes formed on the first and second axial ends of each of the plurality of segmented core sections having a shape that corresponds to and fits within the openings within each of the first and second insulate frames to support the plurality of segmented core sections on the first and second insulate frames, each segmented core section including a first half and a second half that are glued together, each segmented core section being made from one of a soft magnetic composite material and a laminate stack;
   each pole shoe including at least one radial groove formed therein, one of the radial spokes of the first insulate frame being positioned within each of the at least one groove formed within the pole shoe of the first axial end of each of the plurality of segmented core sections, and one of the radial spokes of the second insulate frame being positioned within each of the at least one groove formed within the pole shoe of the second axial end of each of the plurality of segmented core sections;

wherein, one radial spoke of the first insulate frame is positioned between the pole shoes of the first axial ends of each adjacent pair of segmented core sections, and one radial spoke of the second insulate frame is positioned between the pole shoes of the second axial ends of each adjacent pair of segmented core sections, and each of the radial spokes of the first and second insulate frames and the radial grooves formed within the pole shoes of the first and second axial ends of each of the plurality of segmented core sections are one of:

straight and aligned with a radial axis that intersects a central axis of the core;

straight and aligned with an inclined radial axis that does not intersect with the central axis of the segmented stator core; and v-shaped.

\* \* \* \* \*